(12) United States Patent
Holmberg et al.

(10) Patent No.: US 8,337,081 B1
(45) Date of Patent: Dec. 25, 2012

(54) SENSOR ASSEMBLY FOR MOUNTING A TEMPERATURE SENSOR TO A TANK

(75) Inventors: James David Holmberg, Champlin, MN (US); Lynn Fliger, Brooklyn Park, MN (US); Don C. Kennedy, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/346,526

(22) Filed: Jan. 9, 2012

(51) Int. Cl.
*G01J 5/00* (2006.01)

(52) U.S. Cl. ........................................ 374/121
(58) Field of Classification Search ............... 374/121
See application file for complete search history.

(56) References Cited

U.S. PATENT DOCUMENTS

| | | | |
|---|---|---|---|
| 2,107,468 A * | 2/1938 | Canuteson | 374/157 |
| 3,847,350 A | 11/1974 | Thompson | |
| 3,849,350 A | 11/1974 | Matsko | |
| 4,324,944 A | 4/1982 | Weihrich et al. | |
| RE30,936 E | 5/1982 | Kmetz et al. | |
| 4,333,002 A | 6/1982 | Kozak | |
| 4,467,178 A | 8/1984 | Swindle | |
| 4,508,261 A | 4/1985 | Blank | |
| 4,511,790 A | 4/1985 | Kozak | |
| 4,568,821 A | 2/1986 | Boe | |
| 4,588,875 A | 5/1986 | Kozak et al. | |
| 4,692,598 A | 9/1987 | Yoshida et al. | |
| 4,696,639 A | 9/1987 | Bohan, Jr. | |
| 4,734,658 A | 3/1988 | Bohan, Jr. | |
| 4,742,210 A | 5/1988 | Tsuchiyama et al. | |
| 4,770,629 A | 9/1988 | Bohan, Jr. | |
| 4,834,284 A | 5/1989 | Vandermeyden | |
| 4,944,454 A * | 7/1990 | Widemann et al. | 237/12.3 C |
| 4,984,981 A | 1/1991 | Pottebaum | |
| 4,986,468 A | 1/1991 | Deisinger | |
| 5,007,156 A | 4/1991 | Hurtgen | |
| 5,103,078 A | 4/1992 | Boykin et al. | |
| 5,442,157 A | 8/1995 | Jackson | |
| 5,448,038 A * | 9/1995 | Kim | 219/627 |
| 5,622,200 A | 4/1997 | Schulze | |
| 5,660,328 A | 8/1997 | Member | |

(Continued)

FOREIGN PATENT DOCUMENTS

EP    0356609    3/1990

(Continued)

OTHER PUBLICATIONS

U.S. Appl. No. 10/911,151, filed Aug. 3, 2004.

(Continued)

*Primary Examiner* — Lisa Caputo
*Assistant Examiner* — Jamel Williams
(74) *Attorney, Agent, or Firm* — Seager Tufte & Wickhem LLC.

(57) ABSTRACT

A method and system to position a non-immersion temperature sensor relative to a water heater tank is disclosed. An illustrative but non-limiting example may be found in a mounting bracket that includes a body that has a sensor portion configured to receive at least a portion of a temperature sensor assembly. When installed, the mounting bracket may include a biasing element to bias the temperature sensor assembly towards the water heater tank. The bias element may help the temperature sensor assume a proper position relative to the water heater tank, despite variations in equipment that may exist in the field.

19 Claims, 4 Drawing Sheets

U.S. PATENT DOCUMENTS

| | | | |
|---|---|---|---|
| 5,779,143 A | 7/1998 | Michaud et al. | |
| 5,797,358 A | 8/1998 | Brandt et al. | |
| 5,896,089 A | 4/1999 | Bowles | |
| 5,968,393 A | 10/1999 | Demaline | |
| 5,975,884 A | 11/1999 | Dugger | |
| 6,053,130 A | 4/2000 | Shellenberger | |
| 6,059,195 A | 5/2000 | Adams et al. | |
| 6,069,998 A | 5/2000 | Barnes et al. | |
| 6,075,923 A | 6/2000 | Wu | |
| 6,208,806 B1 | 3/2001 | Langford | |
| 6,212,894 B1 | 4/2001 | Brown et al. | |
| 6,261,087 B1 | 7/2001 | Bird et al. | |
| 6,271,505 B1 | 8/2001 | Henderson | |
| 6,293,471 B1 | 9/2001 | Stettin et al. | |
| 6,350,967 B1 | 2/2002 | Scott | |
| 6,363,218 B1 | 3/2002 | Lowenstein et al. | |
| 6,375,087 B1 | 4/2002 | Day et al. | |
| RE37,745 E | 6/2002 | Brandt et al. | |
| 6,560,409 B2 | 5/2003 | Troost, IV | |
| 6,633,726 B2 | 10/2003 | Bradenbaugh | |
| 6,701,874 B1 | 3/2004 | Schultz et al. | |
| 6,795,644 B2 | 9/2004 | Bradenbaugh | |
| 6,861,621 B2 | 3/2005 | Ghent | |
| 6,880,493 B2 | 4/2005 | Clifford | |
| 6,934,862 B2 | 8/2005 | Sharood et al. | |
| 6,936,798 B2 | 8/2005 | Moreno | |
| 6,955,301 B2 | 10/2005 | Munsterhuis et al. | |
| 6,959,876 B2 | 11/2005 | Chian et al. | |
| 7,088,238 B2 | 8/2006 | Karaoguz et al. | |
| 7,117,825 B2 | 10/2006 | Phillips | |
| 7,221,862 B1 | 5/2007 | Miller et al. | |
| 7,252,502 B2 | 8/2007 | Munsterhuis | |
| 7,317,265 B2 | 1/2008 | Chian et al. | |
| 2004/0042772 A1 | 3/2004 | Whitford et al. | |
| 2004/0267385 A1 | 12/2004 | Lingemann | |
| 2005/0077368 A1 | 4/2005 | Zak et al. | |
| 2005/0147401 A1 | 7/2005 | Baxter | |
| 2005/0147402 A1 | 7/2005 | Baxter | |
| 2005/0150967 A1 | 7/2005 | Chapman, Jr. et al. | |
| 2006/0243816 A1 | 11/2006 | Teti | |
| 2007/0023333 A1 | 2/2007 | Mouhebaty et al. | |
| 2007/0034169 A1 | 2/2007 | Phillips | |
| 2007/0191994 A1 | 8/2007 | Patterson et al. | |
| 2007/0246551 A1 | 10/2007 | Phillips et al. | |
| 2007/0295823 A1 | 12/2007 | Yamada et al. | |
| 2008/0023564 A1 | 1/2008 | Hall | |
| 2008/0188995 A1 | 8/2008 | Hotton et al. | |
| 2008/0205481 A1* | 8/2008 | Faries et al. | 374/138 |
| 2008/0216580 A1* | 9/2008 | Kuznia et al. | 73/714 |
| 2009/0309603 A1* | 12/2009 | Harada et al. | 324/438 |
| 2010/0095906 A1* | 4/2010 | Leeland et al. | 122/14.22 |
| 2011/0122918 A1* | 5/2011 | Murray | 374/208 |
| 2011/0147549 A1* | 6/2011 | Hazzard et al. | 248/213.2 |
| 2011/0147552 A1* | 6/2011 | Hazzard et al. | 248/222.14 |
| 2012/0017708 A1* | 1/2012 | Pohle et al. | 73/866.5 |

FOREIGN PATENT DOCUMENTS

| | | | |
|---|---|---|---|
| EP | 0699316 | | 7/1999 |
| GB | 2211331 | | 6/1999 |
| JP | 8264469 | | 10/1996 |
| JP | 10221179 A | * | 8/1998 |
| JP | 2008008548 | | 1/2008 |

OTHER PUBLICATIONS

Lennox, "Network Control Panel, User's Manual," 18 pages, Nov. 1999.

Moog, "M3000 Control System, RTEMP 8, Remote 8-Channel Temperature Controller with CanOpen Interface," 6 pages, Nov. 2004.

* cited by examiner

SENSOR ASSEMBLY FOR MOUNTING A TEMPERATURE SENSOR TO A TANK

TECHNICAL FIELD

The disclosure relates generally to sensor assemblies, and more particularly, to sensor assemblies for mounting non-immersion type temperature sensor relative to a tank.

BACKGROUND

It is often desirable to obtain a measure of the temperature of a fluid (e.g. a liquid or gas) inside of an enclosed tank, such as a water heater tank. While water heaters are described below as one example application, it should be recognized that there are many other applications where it may be desirable to obtain a measure of the temperature of a fluid inside of an enclosed tank. For example, in some industrial applications, it may be desirable to obtain a measure of the temperature of a fluid passing through a supply pipe that is supplying a constituent to an industrial process. In another example, in a food processing application, it may be desirable to obtain a measure of the temperature of a fluid that is in a distilling tower or a fermenting vat. These are just some examples.

Water heaters are used in homes, businesses and just about any establishment having the need for heated water. A conventional water heater typically has at least one heating element or "heater," such as a gas-fired and/or electric burner. Each water heater also typically has at least one thermostat or controller for controlling the heater. The controller typically receives signals related to the temperature of the water within the water heater tank, often from a temperature sensor that is thermally engaged with the water in the water heater tank.

In some instances, a water heater may operate in accordance with a first temperature set point and a second temperature set point. The difference between the first and second temperature set point may be referred to as the temperature differential of the water heater. When temperature signals from the temperature sensor indicate that the water temperature is below the first set point, for example when the water temperature is below about 120° F., the controller may turn on the heater and the water within the water heater tank begins to heat. After some time, the water temperature within the water heater tank will increase to the second set point, which, for example may be about 140° F. At this point, the controller may cause the heater to reduce its heat output or, alternatively, causes the heater to turn off. This heat cycle begins again when the water temperature within the water heater tank cools down below the first set point.

For a gas fired water heater, a temperature sensor, a gas valve and a controller are often mounted relative to the water heater tank. The controller typically receives a temperature signal from the temperature sensor. In some cases, the temperature sensor may protrude into and is thermally coupled to the water in the water heater tank. The controller typically is programmed to control the gas valve such that the temperature of the water in the water heater tank remains between the first and second temperature set points, as described above. For an electric water heater, a temperature sensor, a power delivery unit and a controller may be mounted to the water heater tank. In this case, the controller may control the power delivery unit such that the temperature of the water in the water heater tank is kept between the first and second temperature set points.

In some water heater applications, the temperature sensor may be an immersion-type sensor that, when installed, is immersed in the water to maximize conductive and convective heat transfer with the water in the water heater tank. Such placement of the temperature sensor provides direct contact with the water in the water heater tank, and consequently may provide a fairly accurate measure of water temperature. However, immersion-type sensors typically require a waterproof seal between the sensor and the water heater tank. Also, if the sensor fails and needs to be replaced, the water must typically be drained from the water heater tank.

In some applications, the temperature sensor may be a non-immersion-type sensor that is not immersed in the water of the water heater tank, but rather senses the water temperature from outside of the water heater tank, in some cases, a non-immersion-type temperature sensor may be placed adjacent to an outer wall of the water heater tank. In many cases, non-immersion type temperature sensors can be removed and replaced without draining the water from the water heater tank. However, non-immersion type temperature sensors often need to be placed relatively precisely with respect to the water heater tank in order to provide an accurate and/or reliable calculation of the water temperature inside of the water heater tank. What would be desirable is a device and method for more precisely mounting a non-immersion type temperature sensor relative to a tank, such as a water heater tank.

SUMMARY

The present disclosure relates generally to sensor assemblies, and more particularly, to sensor assemblies for mounting non-immersion type temperature sensor relative to a tank. While water heaters are described below as one example application, it should be recognized that there are many other applications where it may be desirable to obtain a measure of the temperature of a fluid inside of an enclosed tank.

An illustrative, but non-limiting example of the disclosure may be found in a sensor assembly for mounting a temperature sensor relative to a water heater tank. The sensor assembly may include a temperature sensor assembly that has a temperature sensor, a body configured to be secured relative to a water heater tank, and a biasing element situated between the body and the temperature sensor assembly. The biasing element may bias the temperature sensor assembly toward the water heater tank when the body is secured relative to the water heater tank. In some cases, the bias element may help the temperature sensor assume a proper position relative to the water heater tank, despite variations in equipment that may exist in the field.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
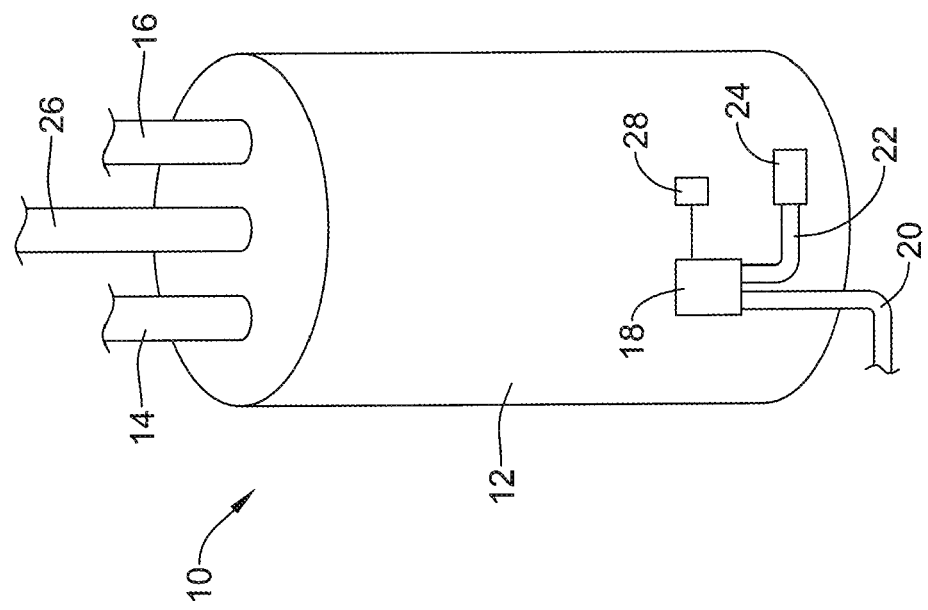
FIG. 1 is a schematic view of an illustrative but non-limiting water heater in accordance with the present disclosure.

While the disclosure is amenable to various modifications and alternative forms, specifics thereof have been shown by way of example in the drawings and will be described in detail. It should be understood, however, that the intention is not to limit the disclosure to the particular illustrative embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

It is often desirable to obtain a measure of the temperature of a fluid (e.g. a liquid or gas) inside of an enclosed tank, such as a water heater tank. While water heaters are described below as one example application, it should be recognized that there are many other applications where it may be desirable to obtain a measure of the temperature of a fluid inside of an enclosed tank. For example, in some industrial applications, it may be desirable to obtain a measure of the temperature of a fluid passing through a supply pipe that is supplying a constituent to an industrial process. In another example, in a food processing application, it may be desirable to obtain a measure of the temperature of a fluid that is in a distilling tower or a fermenting vat. These are just some examples.

FIG. 1 provides a schematic view of an illustrative but non-limiting water heater 10. Water heater 10 includes a water heater tank 12. The water heater tank 12 may include an insulating layer (not explicitly shown) positioned about the water heater tank 12 to help reduce thermal losses from the water heater tank 12. Cold water enters water heater tank 12 through a cold water line 14 and is heated by a gas burner 24. In some cases, the water heater 10 may include an electric heating element rather than a gas burner 24. A power delivery unit (not shown) may be used to selectively apply power (i.e. current) to the electric heating element. In either case, the resulting heated water exits through a hot water line 16. For gas-fired water heaters, a gas control unit 18, such as a gas valve, regulates gas flow from a gas source 20 through a combustion gas line 22 and into gas burner 24. A flue 26 permits combustion byproducts to safely exit.

As can be seen, water heater 10 may include a temperature sensor 28. In some cases, temperature sensor 28 may enter water heater tank 12 at a location laterally offset from gas control unit 18. In some instances, however, temperature sensor 28 may instead be located behind gas control unit 18, and in some cases, may be supported and retained by a common mounting bracket such as that described more fully below. In some embodiments, a non-immersion type temperature sensor may be provided. While not explicitly shown, the water heater tank 12 may include a threaded spud 30 (FIG. 3) or other feature(s) for mounting a non-immersion type temperature sensor 28 relative to the water heater tank 12.

Figure 2:
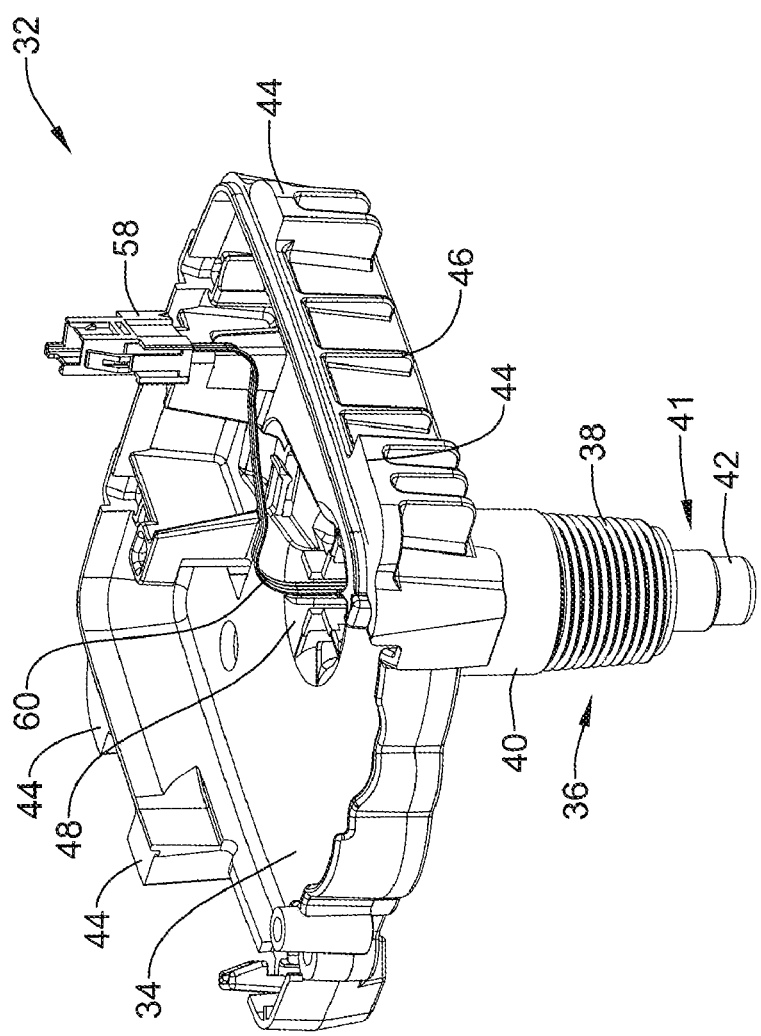
FIG. 2 is a perspective view of an illustrative but non-limiting mounting bracket that may be used in conjunction with the water heater of FIG. 1.

FIG. 2 is a perspective view of an illustrative but non-limiting mounting bracket 32 that may be used in conjunction with the water heater 10. The mounting bracket 32, in combination with the threaded spud 30 (see FIGS. 3-4) may position a temperature sensor assembly 41 in a relatively precise location relative to the water heater tank 12 such that water temperature may be accurately and reliably measured and/or calculated.

In some instances, the mounting bracket 32 may include a component retaining region 34, and a sensor portion 36 forming an elongated stem extending from the component retaining region 34. In the illustrative embodiment, bracket 32 may be configured to retain a gas valve module and/or a water heater controller module (not explicitly shown) within component retaining region 34, as well as a temperature sensor assembly 41 (see also FIG. 3) within elongated stem. Component retaining region 34 may form at least a portion of a housing of a gas control unit, such as gas control unit 18 of FIG. 1, but this is not required. In some instances, component retaining region 34 may include an opening 48 connecting the component retaining region 34 a hollow portion 50 of the sensor portion 36. In some cases, opening 48 may extend from the component retaining region 34 and through the sensor portion 36 to an open end 37 of the sensor portion defining a hollow portion 50.

Bracket 32 may be formed of any suitable material. In some cases, bracket 32 may include non-metallic materials such as a polymeric material, glass, ceramic, plastic, and the like. In some cases, bracket 32 may be manufactured as a single piece by injection molding a nylon material such Hylon®, available from Entec Polymers in Manchester, Tenn. It is contemplated that in some cases, bracket 32 may not be formed entirely from the same material, or bracket 32 may not be formed as a single piece. In some cases, bracket 32 may include metallic materials, if desired.

In the illustrative embodiment, sensor portion 36 of the bracket 32 may include an elongated stem extending from component retaining region 34. Sensor portion 36 may include an internal hollow portion 50 (shown in more detail in FIG. 3) for slidably receiving a temperature sensor assembly 41. In the embodiment shown, the temperature sensor assembly 41 may extend out of an open end 37 of the sensor portion 36 and away from the component retaining region 34. The elongated stem of sensor portion 36 may include a first portion 40 and a threaded region 38 extending around the exterior of the sensor portion 36. In some instances, as illustrated, threaded region 38 can be used to secure bracket 32 to or within a threaded aperture 31 (FIG. 3) of a water heater spud 30. As discussed in more detail below, the sensor portion 36 and temperature sensor assembly 41 may be configured such that when the threaded region 38 is engaged with the threaded water heater spud 30, a temperature sensor 52 (see FIG. 3) may be positioned in a relatively precise position relative to the water heater tank 12.

In some embodiments, bracket 32 may also include two (or more) bosses 44 on a first lateral side, and two (or more) bosses 44 on a second opposing lateral side. While bracket 32 is shown having four bosses 44, it is contemplated that bracket 32 may have any number of bosses 44 as desired, for example, but not limited to, one, two, three, or more. Additionally, it is contemplated that bosses 44 may be disposed on fewer than, or more than, two lateral sides. Bosses 44 may provide, among other things, an area for torque to be applied directly to the bracket 32 during installation. For example, an installation tool may grip and apply torque to bosses 44 to threadably engage threaded region 38 of sensor portion 36 with the threaded water heater spud 30 on a water heater tank 12. In some instances, bosses 44 may further include a rib 46 disposed between adjacent bosses 44. Rib(s) 46 may provide additional support to the bracket 32, and may also help prevent an installation tool from contacting the component retaining region 34 of bracket 32 during installation.

Figure 3:
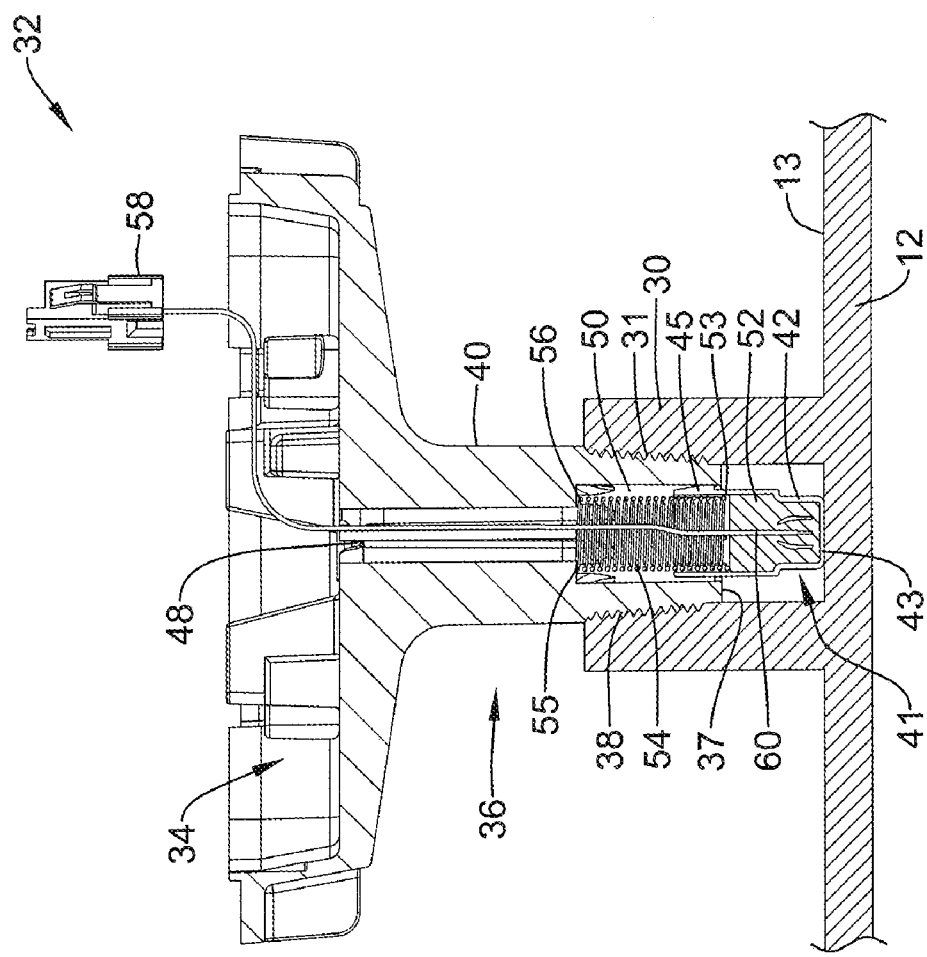
FIG. 3 is a cross-section of an illustrative but non-limiting mounting bracket and temperature sensor assembly engaging an illustrative water heater.

Turning to FIG. 3, which is cross-section of an illustrative, but non-limiting mounting bracket 32 and temperature sensor assembly 41 engaging a threaded aperture 31 of a water heater spud 30. As discussed above, the water heater tank 12 may include a feature(s) for mounting a non-immersion type temperature sensor 52. For example, the water heater tank 12 may include a spud 30 extending from the outer wall 13 thereof. In some instances, the spud 30 may include a threaded aperture 31 for mating with the threaded region 38 of the mounting bracket 32. However it is contemplated that the other retaining feature(s), such an adhesive, friction fit, snap fit, clips, etc. may be used to secure the sensor portion 36 of the bracket 32 to the water heater tank 12.

The temperature sensor assembly 41 may include a thermal conduction temperature sensor 52, sometimes disposed within a capsule 42. It is contemplated that the temperature sensor 52 may be of any type desired and is not necessarily limited to a thermal conduction temperature sensor. The temperature sensor 52 may be electrically connected to a control unit (such as gas control unit 18 in FIG. 1) via an electrical cable 60 and connection element 58 (e.g. plug). In the illustrative embodiment shown, capsule 42 may have a generally cylindrical shape, although this is not required. It is contemplated that the capsule may have any cross-sectional shape desired such as, but not limited to: rectangular, square, elliptical, polygonal, etc. It is further contemplated that the capsule 42 may be sized and shaped to conform to the shape of the temperature sensor 52. However, it is contemplated that the capsule 42 may take any shape as desired. It is contemplated that while the capsule 42 is illustrated has having a first end 43 with a smaller cross-sectional area, the first end 43 may be similar in size or larger than the second end 45 of the capsule 42.

In some embodiments, capsule 42 may include feature(s) adjacent the second end 45 that are configured to maintain a portion of the temperature sensor assembly 41 within the hollow portion 50 of the sensor portion 36. For example, in some instances, the second end 45 of the capsule 42 may include one or more protrusions extending away from the capsule 42. The one or more protrusions may be configured to engage a mating feature, such as a protrusion adjacent the open end 37 on the sensor portion 36, to maintain the temperature sensor assembly 41 within the hollow portion 50 (e.g. to help ensure that the temperature sensor assembly 41 does not slide out of the open end 37 on the sensor portion 36). It is contemplated that the one or more protrusions may be temporarily deformed to allow the temperature sensor assembly 41 to be initially assembled within the hollow portion 50 of sensor portion 36 by inserting the temperature assembly through the open end 37 and into the hollow portion 50. It is further contemplated that the protrusions may also be temporarily deformed if the temperature sensor 52 and/or temperature sensor assembly 41 need to be removed.

In some instances, the temperature sensor assembly 41 may be slidably disposed within or about the hollow portion 50. In some cases, the sensor portion 36 may include a lip or shelf 55 generally perpendicular to the elongated stem to maintain the temperature sensor assembly 41 within a region of the sensor portion 36 between the shelf 55 and the open end 37. The temperature sensor assembly 41 may be movable within the hollow portion 50 to accommodate various size spuds 30, manufacturing tolerances, equipment variations, and/or other variations as desired. For example, if a shorter spud is used, the second end 45 of the capsule 42 may be positioned closer to the shelf 55, whereas if a longer spud 30 is used, the second end 45 may be positioned further from the shelf 55. The sensor portion 36 may include a compliant body 54, such as a biasing element or spring, configured to maintain the temperature sensor assembly 41 in a proper position. In some cases, it is contemplated that the biasing element 54 may be sized to accommodate various water tank spud 30 lengths.

The biasing element 54 may have a first end 53 configured to engage temperature sensor assembly 41, and a second end 56 configured to contact shelf 55. In some instances, the biasing element 54 may be partially disposed within capsule 42. The biasing element 54 may be configured to bias the temperature sensor assembly 41 away from the shelf 55. When the sensor portion 36 of the mounting bracket 32 is engaged with the water tank spud 30, the biasing element 54 may exert sufficient force to bias the temperature sensor assembly 41 towards the water heater tank 12 such that a first end 43 of the temperature sensor assembly 41 physically contacts the outer wall 13 of the water heater tank 12. Physical contact between the first end 43 of the temperature sensor assembly 41 and the outer wall of the water heater tank 12 may increase thermal conduction between the temperature sensor 52 and the water heater tank 12, which may increase the accuracy and reliability of the temperature sensor measurement.

Figure 4:
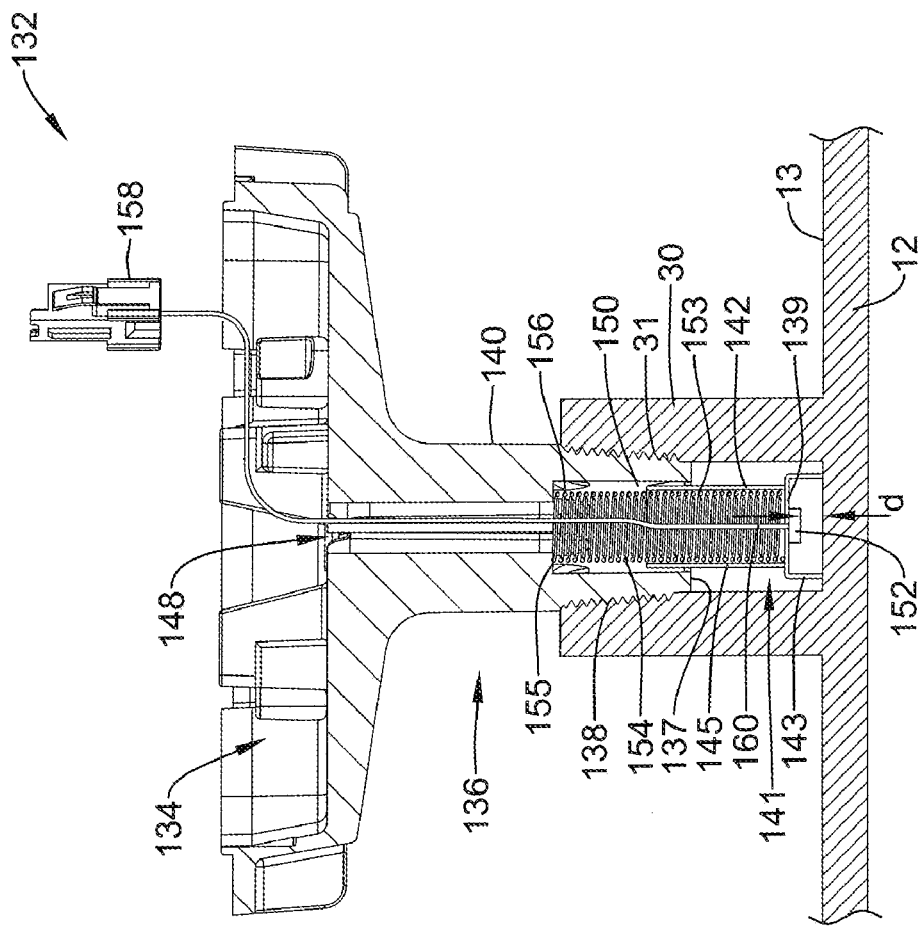
FIG. 4 is a cross-section of another illustrative but non-limiting mounting bracket and temperature sensor assembly engaging an illustrative water heater.

Turning now to FIG. 4, which is cross-section of another illustrative, but non-limiting mounting bracket 132 and temperature sensor assembly 141 engaging a threaded aperture 31 of a water heater spud 30. It is contemplated that the mounting bracket 132 may be similar in form and function to mounting bracket 32 of FIG. 3. For example, while not explicitly shown, the mounting bracket 132 may include bosses and/or ribs to facilitate installation of the bracket 132 and/or to provide additional support. The mounting bracket 132 in combination with the threaded spud 30 may position a temperature sensor assembly 141 in a proper or desired location relative to the water heater tank 12 such that water temperature may be accurately and reliably measured and/or calculated.

In some instances, the mounting bracket 132 may include a component retaining region 134, and a sensor portion 136 extending from the component retaining region 134 forming an elongated stem. In the illustrative embodiment, bracket 132 may be configured to retain a gas valve module and/or a water heater controller module (not explicitly shown) within component retaining region 134, as well as a temperature sensor assembly 141 within elongated stem of sensor portion 136. Component retaining region 134 may form at least a portion of a housing of a gas control unit, such as gas control unit 118 of FIG. 1, but this is not required. In some instances, component retaining region 134 may include an opening 148 connecting the component retaining region 134 a hollow portion 150 of the sensor portion 136. Opening 148 may extend from the component retaining region 134 and through the sensor portion 136 to an open end 137 of the sensor portion defining a hollow portion 150.

Bracket 132 may be formed of any suitable material. In some cases, bracket 132 may include non-metallic materials such as a polymeric material, glass, ceramic, plastic, and the like. In some cases, bracket 132 may be manufactured as a single piece by injection molding a nylon material such Hylon®, available from Entec Polymers in Manchester, Tenn. It is contemplated that in some cases, bracket 132 may not be formed entirely from the same material, or bracket 132 may not be formed as a single piece. In some cases, bracket 132 may include metallic materials, if desired.

In the illustrative embodiment, sensor portion 136 of the bracket 132 may include an elongated stem extending from component retaining region 134. Sensor portion 136 may include an internal hollow portion 150 for slidably receiving a temperature sensor assembly 141. In the embodiment shown, the temperature sensor assembly 141 may extend out of an open end 137 of the sensor portion 136 and away from the component retaining region 134. The elongated stem of sensor portion 136 may include a first portion 140 and a threaded region 138 extending around the exterior of the sensor portion 136. In some instances, as illustrated, threaded region 138 can be used to secure bracket 132 to or within a threaded aperture 131 of a water heater spud 130. As discussed in more detail below, the sensor portion 136 and temperature sensor assembly 141 may be configured such that when the threaded region 138 is engaged with the threaded water heater spud 130, a temperature sensor 152 may be positioned in a relatively precise position relative to the water heater tank 12.

It is contemplated that the temperature sensor assembly 141 may include an infrared (IR) temperature sensor 152 disposed within and attached to a capsule 142. It is contemplated that the temperature sensor 152 may be of any type desired and is not necessarily limited to an IR temperature sensor. The temperature sensor 152 may be electrically connected to a control unit (such as gas control unit 18 in FIG. 1) via an electrical cable 160 and connection element 158 (e.g. plug). Capsule 142 may include a first portion 145 having a first cross sectional area and a second portion 143 having a second cross-sectional area. In some instances, the second cross-sectional area may be larger than the first cross-sectional area, although this is not required. It is contemplated that in some instances, the first portion 145 may have a cross-section that is similar in size or smaller than the cross-section of the second portion 143. It is contemplated that the capsule may have any cross-sectional shape desired such as, but not limited to: rectangular, square, elliptical, polygonal, etc. In some instances, the cross-sectional shapes of the first portion 145 and the second portion 143 may be different. For example, in some embodiments, the first portion 145 may have a generally circular cross-sectional shape while the second portion 143 may have a generally square cross-sectional shape. In other embodiments, the cross-sectional shapes of the first and second portions 145, 143 may be the same or similar. In some embodiments, the first and second portions 145, 143 may be formed from a single piece or a unitary structure. In other embodiments, the first and second portions 145. 143 may be separate components. The first and second portions 145, 143 may be attached in any manner known in the art, such as, but not limited to, welding, brazing, soldering, adhesive, friction fit, snap fit, fasteners, etc.

In some embodiments, the second portion 143 may include a generally solid end 139 adjacent to the first portion 145 of the capsule 142. Temperature sensor 152 may be mounted or otherwise affixed to the solid end 139 such that the temperature sensor 152 faces a water heater tank 12 when the mounting bracket 132 is engaged with a water tank spud 30. Temperature sensor 152 may be mounted to the capsule 142 such that the temperature sensor 152 is partially enclosed within the capsule 142, but this is not required. It is contemplated that the second portion 143 may be sized such that a when the mounting bracket 132 is engaged with a water tank spud 30, the temperature sensor 152 is spaced a predetermined distance 'd' from the outer wall 13 of the water heater tank 12, as shown in FIG. 4. For example, the temperature sensor 152 may be positioned approximately 0.10 inches, 0.25 inches, anywhere between 0.10 inches and 0.25 inches, or any other suitable distance from the outer wall 13 of the water heater tank 12. Capsule 142 may be formed from a relatively non-compliant and/or relatively non-deformable material such that when a biasing force is exerted on the capsule 142 by biasing member 154, the capsule 142 resists deformation and maintains the temperature sensor 152 at a fixed distance from the outer wall 13 of the water heater tank 12.

In some instances, capsule 142 may include features adjacent the first portion 145 thereof that are configured to maintain a portion of the temperature sensor assembly 141 within the hollow portion 150 of the sensor portion 136. For example, in some cases, the first portion 145 of the capsule 142 may include one or more protrusions extending away from the capsule 142. The one or more protrusions may be configured to engage a mating feature such as a protrusion adjacent the open end 137, on the sensor portion 136 to maintain the temperature sensor assembly 141 within the hollow portion 150. It is contemplated that the one or more protrusions may be temporarily deformed to allow the temperature sensor assembly 141 to be assembled within the hollow portion 150 of sensor portion 136 by inserting the temperature assembly through the open end 137 and into the hollow portion 150. It is further contemplated that the protrusions may also be temporarily deformed if the temperature sensor 152 and/or temperature sensor assembly 141 needs to be removed.

In some instances, the temperature sensor assembly 141 may be slidably disposed within or about the hollow portion 150. The sensor portion 136 may include a lip or shelf 155 generally perpendicular to the elongated stem to maintain the temperature sensor assembly 141 within a region of the sensor portion 136 between the shelf 155 and the open end 137. The temperature sensor assembly 141 may be movable within the hollow portion 150 to accommodate various size spuds 30. For example, if a shorter spud is used, the first portion 145 of the capsule 142 may be positioned closer to the shelf 155, whereas if a longer spud 30 is used, the first portion 145 may be positioned further from the shelf 155. The sensor portion 136 may further include a compliant body 154, such as a biasing element or spring, configured to maintain the temperature sensor assembly 141 in a specified position. It is contemplated that the biasing element 154 may be sized to accommodate various water tank spud 30 lengths. For example, the biasing element 154 may have a first end 153 configured to contact the generally solid end 139 of the capsule 142 and a second end 156 configured to contact shelf 155. In some instances, the biasing element 154 may be partially disposed within capsule 142. The biasing element 154 may be configured to bias the temperature sensor assembly 141 away from the shelf 155. When the sensor portion 136 of the mounting bracket 132 is engaged with the water tank spud 30, the biasing element 154 may be configured to bias the temperature sensor assembly 141 towards the water heater tank 12 such that a second portion 143 of the capsule 142 physically contacts the outer wall 13 of the water heater tank 12. The biasing element 154 may exert sufficient force on the temperature sensor assembly 141 to continually bias the temperature sensor assembly 141 towards the outer wall 13 of the water heater tank 12. Physical contact between the second portion 143 of the capsule 142 and the outer wall 13 of the water heater tank 12 may maintain the temperature sensor 152 a fixed distance 'd' from the outer wall 13 of the water heater tank 12 such that water temperature may be accurately and reliably measured and/or calculated.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

We claim:

1. A sensor assembly for mounting a temperature sensor relative to a water heater tank, the sensor assembly comprising:
    a temperature sensor assembly for receiving a temperature sensor;
    a body configured to be secured relative to the water heater tank;
    the body including an elongated stem extending away from the body toward a distal end, the distal end of the elongated stem having an opening;
    the elongated stem slidably receiving at least part of the temperature sensor assembly; and
    a biasing element situated between the body and the temperature sensor assembly, the biasing element biasing the temperature sensor assembly toward the water heater tank when the body is secured relative to the water heater tank such that the temperature sensor assembly at least partially extends through the opening of the elongated stem of the body.

2. The sensor assembly of claim 1, wherein the body is part of a mounting bracket, and the elongated stem has hollow portion for receiving at least part of the temperature sensor assembly.

3. The sensor assembly of claim 2, wherein the temperature sensor assembly is slidably disposed within the hollow portion of the elongated stem.

4. The sensor assembly of claim 2, wherein the temperature sensor assembly further comprises a capsule surrounding at least part of the temperature sensor.

5. The sensor assembly of claim 4, wherein the capsule includes protrusions configured to maintain the temperature sensor assembly within the hollow portion of the elongated stem.

6. The sensor assembly of claim 2, wherein the elongated stem includes a threaded portion extending around an outer surface thereof.

7. The sensor assembly of claim 6, wherein the threaded portion is configured to engage a threaded portion of a water tank spud to secure the body relative to the water heater tank.

8. The sensor assembly of claim 1, wherein the biasing element is configured to bias the temperature sensor assembly such that at least part of the temperature sensor assembly physically engages the water heater tank when the body is secured relative to the water heater tank.

9. An assembly for mounting a temperature sensor relative to a water heater tank, the assembly comprising:
    a temperature sensor assembly including a thermal conduction temperature sensor;
    a mounting bracket including a body having a sensor portion, the temperature sensor assembly slidably coupled relative to the sensor portion of the mounting bracket; and
    a biasing element for biasing the temperature sensor assembly away from the sensor portion of the mounting bracket;
    wherein the sensor portion of the mounting bracket includes an elongated stem that has a hollow portion defining a shelf for receiving at least part of the temperature sensor assembly.

10. The assembly of claim 9, wherein the biasing element is disposed between the shelf and the temperature sensor assembly.

11. The assembly of claim 9, wherein the sensor portion includes a threaded portion extending around an outer surface thereof.

12. The assembly of claim 11, wherein the threaded portion is configured to engage a threaded portion of a water tank spud for securing the mounting bracket relative to the water heater tank.

13. The assembly of claim 9, wherein when the mounting bracket is secured relative to the water heater tank, the biasing element is configured to bias the temperature sensor assembly such that the temperature sensor is in thermal contact with an outer wall of the water heater tank.

14. An assembly for mounting a temperature sensor relative to a water heater tank, the assembly comprising:
    a temperature sensor assembly including an infrared temperature sensor and a capsule at least partially enclosing the infrared temperatures sensor, a distal end of the capsule defining an opening and extending out past the infrared temperature sensor in a direction toward the water heater tank such that the infrared temperature sensor is recessed back relative to the distal end of the capsule and the water heater tank when the assembly is mounted to a water heater tank;
    a mounting bracket including a body having a sensor portion, the temperature sensor assembly slidably coupled relative to the sensor portion of the mounting bracket; and
    a biasing element disposed between the sensor portion and the temperature sensor assembly.

15. The assembly of claim 14, wherein the capsule includes a first portion disposed adjacent to the biasing element and second portion disposed adjacent to the infrared temperature sensor.

16. The assembly of claim 15, wherein the infrared temperature sensor is affixed to the second portion of the capsule such that the infrared temperature sensor is spaced a predetermined distance from the distal end of the capsule.

17. The assembly of claim 16, wherein the sensor portion of the mounting bracket is configured to engage a water tank spud.

18. The assembly of claim 17, wherein the biasing element is configured to bias the temperature sensor assembly towards the water heater tank such that the distal end of the capsule physically engages an outer wall of the water heater tank when the sensor portion of the mounting bracket is engaged with the water tank spud.

19. The assembly of claim 14, where the temperature sensor assembly is slidably received within at least part of the sensor portion of the mounting bracket.

* * * * *